United States Patent [19]

Forth

[11] 3,907,917
[45] Sept. 23, 1975

[54] ISOPRENE PRODUCTION

[75] Inventor: Timothy Frederick Forth, Fetcham, England

[73] Assignee: The British Petroleum International Ltd., London, England

[22] Filed: Dec. 4, 1974

[21] Appl. No.: 529,559

[52] U.S. Cl. .................. 260/680 R; 260/680 XA
[51] Int. Cl.² ........................................... C07C 1/30
[58] Field of Search .............. 260/680 R, 680 XA

[56] References Cited
UNITED STATES PATENTS

| | | | |
|---|---|---|---|
| 1,198,943 | 9/1916 | Matthews et al. | 260/680 XA |
| 1,298,929 | 4/1919 | Graul et al. | 260/680 XA |
| 2,243,191 | 5/1941 | Cantzler et al. | 260/680 XA |
| 2,288,580 | 6/1942 | Baehr et al. | 260/680 XA |
| 2,310,523 | 2/1943 | Groll et al. | 260/680 XA |
| 3,796,767 | 3/1974 | McNulty et al. | 260/680 R |

*Primary Examiner*—Paul M. Coughlan, Jr.
*Attorney, Agent, or Firm*—Morgan, Finnegan, Pine, Foley & Lee

[57] ABSTRACT

The present invention relates to a process for producing isoprene first by chlorinating 2-methylbutene-2 at elevated temperature and pressure and subsequently dehydrochlorinating the chlorinated product to obtain isoprene. The feature of the invention lies in the dehydrochlorination step which is carried out in the absence of a catalyst but using n-butane or isobutane as diluent.

10 Claims, No Drawings

ISOPRENE PRODUCTION

The present invention relates to a process for the production of isoprene by chlorination of 2-methylbutene-2 (2MB2) followed by dehydrochlorination of the product.

It is known to produce isoprene by chlorinating 2-methylbutene-2 and subsequently dehydrochlorinating the product over a dehydrohalogenation catalyst at a temperature of 100° to 350°C using an inert diluent such as nitrogen. Typical catalysts used in the process are compounds of metals of Groups 1B, II and VIII of the Periodic Table supported on silica, alumina, silica/alumina and kieselguhr of defined pore size and surface area. One of the problems associated with prior art catalytic dehydrohalogenation processes is loss of catalytic activity due to polymerisation and coke laydown on the catalyst.

It has now been surprisingly found that high yields of isoprene are obtained by effecting the dehydrochlorination reaction in the absence of a catalyst but in the presence of a specific diluent.

Thus according to the present invention there is provided a process for the production of isoprene from 2-methylbutene-2 which process comprises reacting in the gas phase 2-methylbutene-2 with gaseous chlorine in a chlorine to 2-methylbutene-2 molar ratio of between 0.8:1 and 3:1 to form a product containing chlorinated 2-methylbutene-2 and subsequently dehydrochlorinating said product in the presence of an inert diluent selected from n-butene and isobutane and in the absence of a catalyst at a temperature between 300° and 800°C.

The chlorination of 2-methylbutene-2 is an extremely facile exothermic reaction and may be effected simply by contacting gaseous chlorine with 2-methylbutene-2 in the absence of a catalyst.

The chlorination reaction may be carried out either in the presence or absence of an inert diluent. Suitable diluents include nitrogen, HCl gas, n-butene and isobutane. In a continuous process in the gas phase the residence time is suitably in the range 1–10 seconds. The diluent to 2-methylbutene-2 molar ratio may be in the range of 0 to 20:1, preferably 3 to 10:1. The chlorination of 2-methylbutene-2 when effected in the presence of a diluent facilitates efficient mixing of the reactants and prevents excessive temperature rise.

The major products (about 80 per cent) of the reaction between chlorine and 2-methylbutene-2 are monochloromethylbutene and hydrogen chloride by substitution and dichloromethylbutane (about 20 per cent) by addition.

The molar ratio of chlorine to 2-methylbutene-2 in the feedstock is preferably between 0.9:1 and 1.1:1 and is even more preferably between 0.95:1 and 1.05:1. An excess of chlorine promotes secondary reactions to give undesirable heavy ends such as dichloromethylbutenes and trichloromethylbutane. On the other hand too large an excess of 2-methylbutene-2 partly reacts with by-product hydrogen chloride giving t-amyl chloride, which on subsequent dehydrochlorination yields 2-methylbutene-2, and partly passes through unreacted. Thus too large an excess of 2-methylbutene-2 in the feedstock leads to a final isoprene product containing 2-methylbutene-2 impurity which requires a costly extractive distillation to separate.

The chlorination of 2-methylbutene-2 is preferably effected at a temperature between ambient and 400°C. The pressure may be in the range 0 to 2,000 psig, preferably 0 to 100 psig.

Whilst it is preferred to separate the chlorinated 2-methylbutene-2 products from the total products of the reaction between chlorine and 2-methylbutene-2 and treat only these to dehydrochlorination, the total product, including hydrogen chloride, may be fed to the dehydrochlorination reaction.

Dehydrochlorination is preferably effected at a temperature in the range 500° to 600°C. The pressure may be in the range 0 to 2,000 psig, preferably 0 to 500 psig. In a continuous process the dehydrochlorination residence time may be between 0.01 and 20, preferably between 0.1 and 5.0 seconds.

Dehydrochlorination is effected in the presence of an inert diluent which is n-butane, isobutane or mixtures thereof. Normal- and iso-butane are particularly suitable inert diluents for this step because they have the following advantages:

1. Efficient separation of the cracker products from HCl and butanes is achieved by distillation, which minimises the back-reaction of HCl and isoprene to form chlorinated 2-methylbutene-2. If nitrogen is used as diluent, the cracker products would have to be absorbed in either a high boiling hydrocarbon or in a recycled chlorinated compound. This absorber is likely to be both large and expensive so butanes have a definite cost advantage in this step.

2. In the separation of HCl from butanes, butanes can be separated by distillation and recycled back to the cracker in the complete absence of water. Nitrogen would again require an absorber using either water or dilute hydrochloric acid to remove the HCl, and the nitrogen would have to be exhaustively dried before recycle to avoid corrosion problems in the cracker section. This equipment would be both large and expensive so the alternative butane diluent has a further advantage.

3. Relative ease of condensation of butanes reduces cost of diluent recycle.

Thus there are a number of technical advantages is using butane as a diluent which in comparison with say nitrogen lead to a large saving in the capital cost of the plant.

The inert diluent to dehydrochlorination feed molar ratio is preferably in the range 3 to 10:1.

Following the dehydrochlorination stage isoprene may be separated from diluent and hydrogen chloride by any means known in the art, for example by distillation. The isoprene may be further purified by known methods, e.g., distillation.

Chlorine may be regenerated for recycle to the chlorination reaction from the separated hydrogen chloride, suitably by electrolysis or oxidation.

The major use of isoprene monomer is in the manufacture of synthetic elastomers.

The invention will be illustrated by the following Examples:

EXAMPLE 1

Gas Phase Chlorination of 2-methylbutene-2 (2-MB-2)

2-MB-2 was passed through a capillary from a graduated burette. A constant pressure of nitrogen was used to control the rate of low. n-Butane (when used) was monitored at a constant rate with a flow rotameter and mixed with 2-MB-2. This mixed feed was preheated in a tube 30 cm. long, 1.5 cm internal diameter and packed with ⅛ in. raschig rings, kept in a furnace at 100°C. This mixed feed stream was mixed with chlorine, monitored with a rotameter at a constant rate, at the top of a lagged glass capillary of 2 mm internal diameter 25 cm. long. Hydrogen chloride (when used as gaseous diluent) was added in measured amounts to the chlorine feed. The reaction products were trapped out in solid carbon dioxide/acetone cooled traps and analysed by gas-liquid chromatography.

The reaction conditions and product analyses are shown in Tables 1 and 2 below:

Table 1

(a) n-Butane Diluent

| | |
|---|---|
| 2-MB-2 (liquid) feed rate | 2.1 ml/min |
| Chlorine feed rate | 463 ml/min |
| n-Butane feed rate | 3470 ml/min |
| Temperature | 50°C (exterior reaction surface) |

| Product (excluding n-Butane)[1] | % wt |
|---|---|
| 2MB2 | 0.0 |
| Chlorobutanes | 0.2 |
| t-amylchloride | 0.0 |
| Monochloromethylbutanes | 82.9 |
| Dichloromethylbutanes | 16.9 |
| Heavy ends | tr |

Table 2

(b) Hydrogen Chloride Diluent

| | |
|---|---|
| 2MB2 (liquid) feed rate | 2.0 ml/min |
| Chlorirne feed rate | 435 ml/min |
| hydrogen chloride feed rate | 3480 ml/min |

| Product[1] | % wt |
|---|---|
| 2MB2 | 0.1 |
| t-amylchloride | 0.5 |
| Monochloromethylbutenes | 77.3 |
| Dichloromethylbutanes | 17.1 |
| 2,3-Dichloropentane[2] | 1.4 |
| Heavy Ends | 3.6 |

[1]Hydrogen chloride in products ignored.
[2]From pentene-2 present in feed.

Dehydrochlorination

The chlorinated products prepared by the reaction of chlorine and 2-methylbutene-2 in gaseous phase with hydrogen chloride diluent under the conditions of Table 2 were metered under nitrogen pressure and mixed with n-butane diluent which had been preheated to 400°C in a 10 ft., ⅛ inch internal diameter steel tube heated in an electric furnace. The gases were then passed through an empty quartz tube 30 cm. long and of 1.0 cm internal diameter which was maintained at the desired reaction temperature in an electric furnace. The reaction products were either sampled in the gas-phase with a heated glass syringe or condensed in a solid carbon dioxide/acetone trap, before analysis by Gas Liquid Chromatography.

The feedstock analysis, reaction conditions and product analysis are given in the following Table 3.

Table 3

| | |
|---|---|
| Feed rate ml./min | 0.36 |
| Diluent ml/min | n-butane, 397 |
| Temperature °C | 570 |
| Pressure | atmospheric |
| Residence time sec | 0.8 |

Table 3-Continued

| Component | % wt. in Feed | % wt. in Product* |
|---|---|---|
| Isoprene | 0.0 | 91.7 |
| 2MB2 | 0.1 | 1.3 |
| t-amychloride | 0.2 | trace |
| Monochloromethylbutenes | 77.8 | 5.4 |
| Dichloromethylbutanes | 18.6 | trace |
| Dichloropentanes | 1.4 | trace |
| Heavy ends | 1.9 | 1.6 |

*Diluent, HCl and piperylenes (ex dichloropentanes) have been ignored in product spectra.

Comparison Test 1

A chlorinated 2-MB-2 feedstock prepared by the reaction of chlorine and 2-MB-2 in the gaseous phase in the presence of hydrogen chloride diluent under the conditions shown in Table 2 of the Example and having the composition shown in Table 4 was dehydrochlorinated according to the method described in the Example except that the preheater temperature was 200°C and 10 ml of the catalyst was packed in the quartz reactor.

The feedstock analysis reaction conditions and product analysis are given in Table 4.

Table 4

| | |
|---|---|
| Catalyst | Davison grade 57 SiO$_2$, 30–60BSS, 10 ml |
| Activation | 30 min. under N$_2$ at 400°C |
| Feed rate ml/min | 0.1 |
| Diluent ml/min | n-butanae, 150 |
| Temperature °C | 230 |
| Pressure | atmospheric |

| Component | % wt. in Feed | % wt. in Product* |
|---|---|---|
| Isoprene | 0.0 | 76.5 |
| 2-MB-2 | trace | 1.0 |
| t-amylchloride | 0.2 | trace |
| Monochloromethylbutenes | 74.8 | 19.5 |
| Dichloromethylbutanes | 19.5 | trace |
| Dichloropentanes | 4.0 | trace |
| Heavy ends | 1.5 | 3.0 |

*Diluent, HCl and piperylene have been ignored in produce spectra.

The results from the Example and Comparison Test show that higher yields and selectivities of isoprene can be obtained when the dehydrochlorination reaction is performed in the absence of a catalyst.

Comparison Test 2

A chlorinated 2-MB-2-feedstock prepared by the reaction of chlorine and 2-MB-2in the gaseous phase in the presence of hydrogen chloride diluent under the conditions shown in Table 2 of the Example and having the composition shown in Table 5 was dehydrochlorinated according to the method described in U.S. Pat. No. 3,522,325. The gaseous reactor effluent was first passed through a caustic scrubber to remove hydrogen chloride and then analysed by on-line G.L.C.

Table 5

| | |
|---|---|
| Catalyst | 5% HgCl$_2$, 20% BaCl$_2$ on Davison Grade 70, SiO$_2$ 30–60 BSS (30 ml) prepared by impregnation of the salts from aqueoussolution. |
| Activation | 30 min. under N$_2$ at 300°C |
| Feed rate ml/min | 0.35 |
| Nitrogen Diluent ml/min | 520 |
| Temperature °C | 250 |
| Pressure | atmospheric |
| Contact time | 1.6 sec |

Table 5-Continued

| Component | % wt. in Feed | % wt. in product* |
|---|---|---|
| Isoprene | 0.0 | 27.3 |
| Pentene-2 | trace | 0.1 |
| 2MB2 | 0.4 | 0.3 |
| t-amychloride | 0.4 | trace |
| Monochloromethylbutenes | 72.5 | 6.8 |
| Dichloromethylbutanes | 22.6 | 2.1 |
| Dichloropentanes | 2.9 | 1.8 |
| Heavy Ends | 1.2 | 61.6 |

*$N_2$ diluent, HCl and piperylenes have been ignored in product spectra.

In comparison with Example 1 the results again show that higher yields and selectivities of isoprene can be obtained when the dehydrochlorination reaction is performed in the absence of a catalyst and using a butane diluent.

EXAMPLE 2

A chlorinated 2-MB-2 feedstock prepared by the reaction of chlorine and 2-MB-2 in the gaseous phase in the presence of hydrogen chloride diluent under the conditions shown in Table 2 of Example 1, and having the composition shown in Table 6, was dehydrochlorinated in a manner similar to Example 1 but using an iso-butane diluent. The chlorinated 2-MB-2 was metered under nitrogen pressure and mixed with isobutane which had been preheated to 400°C in a 10 ft., ⅛ inch internal diameter steel tube heated in an electric furnace. The gases were then passed through an empty quartz tube, volume 14 ml, which was maintained at the desired reaction temperature in an electric furnace. The reaction products were analysed using on-line Gas Liquid Chromatography.

The reaction conditions and product analyses are given in the following Table 6:

Table 6

| Feed rate ml/min | 0.5 |
| Diluent ml/min | iso-butane, 496 |
| Pressure | atmospheric |
| Residence time sec. | 0.5 |

| No. | | 1 | 2 | 3 |
|---|---|---|---|---|
| Temperature °C | | 550 | 600 | 650 |
| Component | % wt. in Feed | % wt. in Product* | | |
| Isoprene | 0.0 | 26.4 | 39.6 | 77.1 |
| 2MB2 | 0.3 | 1.0 | 1.4 | 1.6 |
| t-amychloride | 1.3 | trace | trace | trace |
| Monochloromethylbutenes | 73.5 | 63.8 | 51.3 | 11.2 |
| Dichloromethylbutanes | 21.6 | 1.9 | 0.0 | 0.0 |
| Dichloropentanes | 1.2 | | | |
| Heavy Ends | 2.1 | 6.9 | 7.7 | 10.1 |

*Iso-butane, HCl, and piperylenes have been ignored in product spectra.

EXAMPLE 3

A chlorinated 2-MB-2 feedstock prepared by the reaction of chlorine and 2-MB-2 in the gaseous phase in the presence of hydrogen chloride diluent under the conditions shown in Table 2 of Example 1, and having the composition shown in Table 7, was dehydrochlorinated in a manner similar to Example 1 using a n-butane diluent and a higher residence time. The chlorinated 2-MB-2 was metered under nitrogen pressure and mixed with n-butane which had been preheated to 400°C in a loft ⅛ inch internal diameter steel tube heated in an electric furnace. The gases were then passed through an empty quartz tube, volume 14 ml, which was maintained at the desired reaction temperature in an electric furnace. The reaction products were analysed using on-line Gas liquid Chromatography.

The reaction conditions and product analyses are given in the following Table 7.

| No. | | 1 | 2 | 3 |
|---|---|---|---|---|
| Temperature °C | | 550 | 570 | 600 |
| Component | % wt. In Feed | % wt. in Product* | | |
| Isoprene | 0.0 | 49.6 | 58.7 | 86.9 |
| 2-MB-2 | 0.3 | 1.5 | 1.5 | 1.7 |
| t-amychloride | 1.3 | trace | trace | trace |
| Monochloromethylbutenes | 73.5 | 45.2 | 35.5 | 6.5 |
| Dichloromethylbutanes | 21.6 | 0.0 | 0.0 | 0.0 |
| Dichloropentanes | 1.2 | | | |
| Heavy Ends | 2.1 | 3.7 | 4.3 | 4.9 |

*N-butane, HCl, and piperylenes have been ignored in product spectra.

I claim:

1. A process for the production of isoprene from 2-methylbutene-2 which process comprises reacting in the gas phase 2-methylbutene-2 with gaseous chlorine in a chlorine to 2-methylbutene-2 molar ratio of between 0.8:1 and 3:1 at a temperature below 400°C and a pressure below 2000 psig to form a product containing chlorinated 2-methylbutene-2 and subsequently dehydrochlorinating said product in the presence of an inert diluent selected from n-butane and isobutane and in the absence of a catalyst at a temperature between 300° and 800°C. and at a pressure below 2,000 psig.

2. A process according to claim 1 wherein the gaseous chlorine is contacted with 2-methylbutene-2 in the absence of a catalyst.

3. A process according to claim 1 wherein the residence time during chlorination in a continuous process is in the range 5 to 10 seconds.

4. A process according to claim 1 wherein gaseous chlorine is reacted with 2-methylbutene-2 in the presence of an inert diluent selected from nitrogen, hydrogen chloride gas, n-butane and isobutane.

5. A process according to claim 1 wherein the diluent to 2-methylbutene-2 molar ratio for chlorination is in the range 3 to 10:1.

6. A process according to claim 1 wherein the molar ratio of chlorine to 2-methylbutene-2 in the feedstock is in the range 0.9:1 to 1.1:1.

7. A process according to claim 1 wherein the pressure during chlorination is in the range 0 to 100 psig.

8. A process according to claim 1 wherein dehydrochlorination is effected at a temperature in the range 500° to 600°C.

9. A process according to claim 1 wherein the pressure during dehydrochlorination is in the range 0 to 500 psig.

10. A process according to claim 1 wherein the molar ratio of diluent to dehydrochlorination feed is in the range 3 to 10:1.

* * * * *